United States Patent
Aho et al.

(10) Patent No.: US 6,563,739 B2
(45) Date of Patent: May 13, 2003

(54) SYSTEM AND METHOD FOR TRANSFERRING DATA BETWEEN DIFFERENT TYPES OF MEMORY USING A COMMON DATA BUS

(75) Inventors: Ari Aho, Tampere (FI); Matti Floman, Tampere (FI); Markku Lipponen, Tampere (FI)

(73) Assignee: Nokia Mobile Phones Limited, Espoo (JP)

( * ) Notice: Subject to any disclaimer, the term of this patent is extended or adjusted under 35 U.S.C. 154(b) by 0 days.

(21) Appl. No.: 09/740,802

(22) Filed: Dec. 21, 2000

(65) Prior Publication Data

US 2001/0019509 A1 Sep. 6, 2001

(30) Foreign Application Priority Data

Dec. 22, 1999 (GB) ............................................. 9930413

(51) Int. Cl.$^7$ ............................................. G11C 16/06
(52) U.S. Cl. ............................ 365/185.23; 365/185.08; 365/185.11
(58) Field of Search ...................... 365/185.08, 185.23, 365/233, 230.03, 185.11

(56) References Cited

U.S. PATENT DOCUMENTS

| | | | |
|---|---|---|---|
| 4,281,392 A | | 7/1981 | Grants et al. ................ 711/172 |
| 5,040,153 A | | 8/1991 | Fung et al. ............. 365/230.03 |
| 5,200,600 A | * | 4/1993 | Shinagawa ................... 235/492 |
| 5,528,758 A | * | 6/1996 | Yeh ................................ 710/1 |
| 5,574,859 A | * | 11/1996 | Yeh ............................ 710/300 |
| 5,666,495 A | * | 9/1997 | Yeh ............................ 710/303 |
| 5,838,603 A | * | 11/1998 | Mori et al. .................... 365/63 |
| 5,848,247 A | * | 12/1998 | Matsui et al. ................ 710/104 |
| 6,026,020 A | * | 2/2000 | Matsubara et al. ..... 365/185.11 |
| 6,253,297 B1 | * | 6/2001 | Chauvel et al. ............. 711/167 |
| 6,273,335 B1 | * | 8/2001 | Sloan .......................... 235/382 |

FOREIGN PATENT DOCUMENTS

EP        0 782 077        7/1997

* cited by examiner

Primary Examiner—David Nelms
Assistant Examiner—Gene N. Auduong
(74) Attorney, Agent, or Firm—Antonelli, Terry, Stout & Kraus, LLP

(57) ABSTRACT

A memory controller for controlling the transfer of data to and from a memory array, wherein the memory array includes a first type of memory and a second type of memory, the first type having a different signalling protocol from the second type of memory, wherein the memory controller comprises:

an address decoder having an input for receiving a memory access request, said memory access request including the address of the memory array to be accessed, and an output for outputting the address of the memory array to be accessed;

a first sub-controller for generating a plurality of memory interface signals for controlling the first type of memory, said first sub-controller being operated in response to addresses within a first range of addresses output by the address decoder; and a second sub-controller for generating a plurality of memory interface signals for controlling the second type of memory, said second sub-controller being operated in response to addresses within a second, non-overlapping range of addresses output by the address decoder.

19 Claims, 3 Drawing Sheets

SYSTEM AND METHOD FOR TRANSFERRING DATA BETWEEN DIFFERENT TYPES OF MEMORY USING A COMMON DATA BUS

BACKGROUND OF THE INVENTION

1. Field of the Invention

This invention relates to a memory controller and in particular to a memory controller for controlling the transmission of data to and from a memory array comprising at least a first type and a second type of memory.

2. Description of the Prior Art

An example of a known memory controller is described in U.S. Pat. No. 5,721,860.

SUMMARY OF THE INVENTION

In accordance with the invention there is provided a memory controller for controlling the transfer of data to and from a memory array, wherein the memory array includes a first type of memory and a second type of memory, the first type having a different signalling protocol from the second type of memory, wherein the memory controller comprises:

- an address decoder having an input for receiving a memory access request, said memory access request including the address of the memory array to be accessed, and an output for outputting the address of the memory array to be accessed;
- a first sub-controller for generating a plurality of memory interface signals for controlling the first type of memory, said first sub-controller being operated in response to addresses within a first range of addresses output by the address decoder; and
- a second sub-controller for generating a plurality of memory interface signals for controlling the second type of memory, said second sub-controller being operated in response to addresses within a second, non-overlapping range of addresses output by the address decoder.

A user can therefore define the areas of memory to be dedicated to a particular type of memory and add these types of memory as and when required. Such a memory controller therefore provides a user with the flexibility to connect different types of memory to a device via a single bus and to store information as to the address range to be allocated to a particular type of memory.

The memory controller of the invention may be used in a variety of electronic devices such as portable radio telecommunications devices (e.g. telephones and communicators).

Preferably the first type of memory is a burst mode type of memory, in particular flash memory. The memory may be synchronous or asynchronous. The addressing protocol may include multiplexed address and data.

Preferably parameters of the memory controller are configurable e.g. the first and second range of addresses may be configurable.

In accordance with the invention there is also provided a method of controlling the transfer of data to and from a memory array in an electronic device, wherein the memory array includes a first type of memory and a second type of memory, the first type having a different signalling protocol from the second type of memory, wherein the method comprises:

receiving a memory access request, said memory access request including the address of the memory array to be accessed, and outputting the address of the memory array to be accessed;

in response to addresses within a first range of addresses generating a plurality of memory interface signals for controlling the first type of memory; and in response to addresses within a second, non-overlapping range of addresses generating a plurality of memory interface signals for controlling the second type of memory.

BRIEF DESCRIPTION OF THE DRAWINGS

The invention will now be described, by way of example only, with reference to the accompanying drawings, in which.

DETAILED DESCRIPTION OF THE PREFERRED EMBODIMENTS

Figure 1:
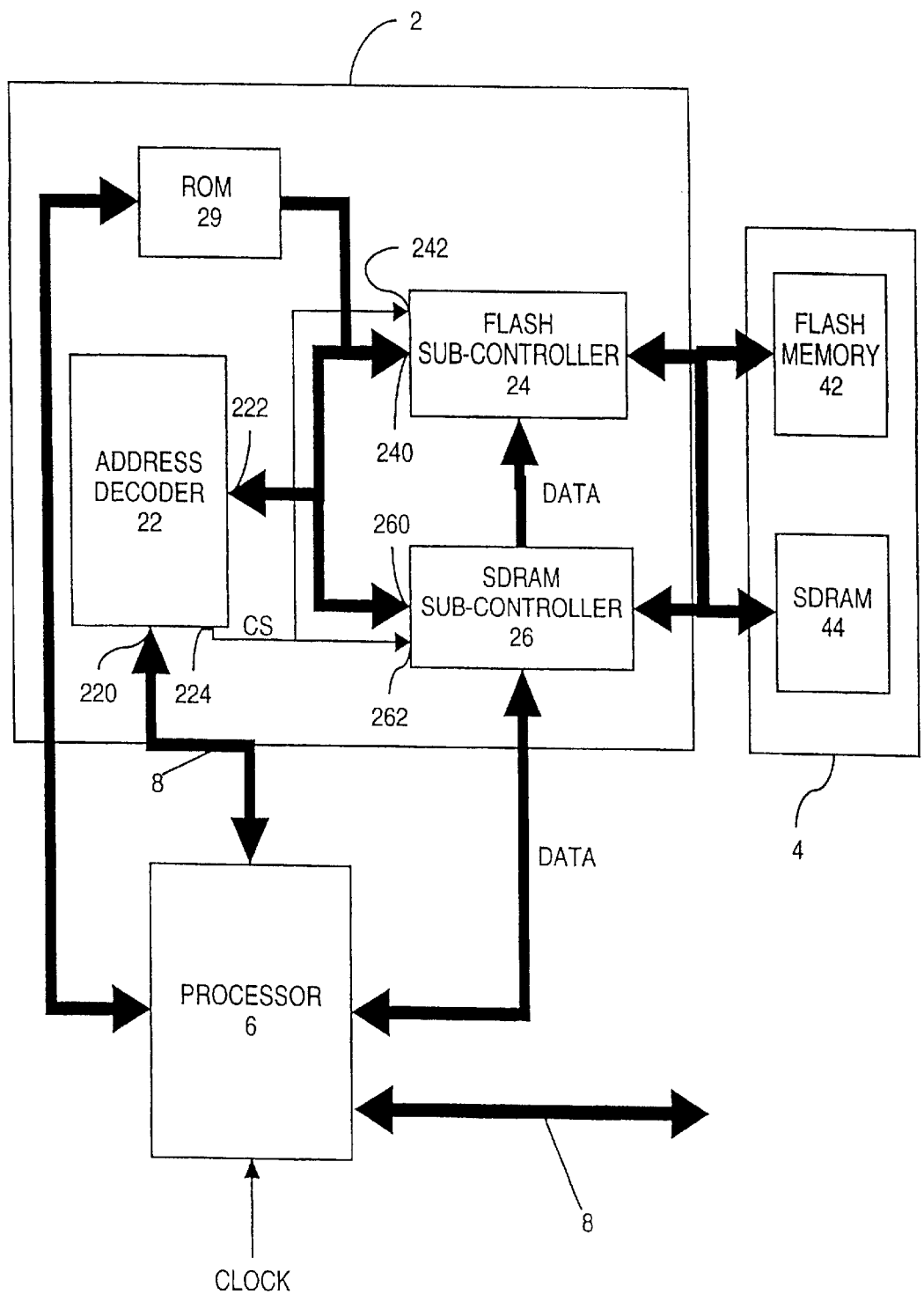
FIG. 1 shows the components of a memory controller in accordance with the invention.

As shown in FIG. 1 a memory controller 2 in accordance with the invention comprises an address decoder 22 and at least a first sub-controller 24 and a second sub-controller 26. The memory controller 2 controls the transfer of data to and from a memory array 4 and operates under control of a microprocessor 6.

The memory array 4 comprises at least a first type of memory 42 and a second type of memory 44. The first type of memory 42 is of a burst mode type, preferably a synchronous burst mode type e.g. the flash memory chip 28F160F3 from Intel Corporation. The second memory type is a Synchronous Dynamic Random Access Memory (SDRAM). Generally software is stored in the SDRAM whilst it is not running in the burst mode memory. Generally the burst mode memory is used for the storage of code that is accessed frequently. Flash is the preferred type of burst mode memory since Flash memory is a non-volatile memory that can be erased in blocks. Flash is used to store application programs and user data and also provides "execute in place" functionality. Mask-ROM is another example of burst mode memory.

The memory controller 2 operates under control of a microprocessor 6, which may be dedicated to this task. However the microprocessor 6 may also be a microprocessor shared between many resources of the device with which the memory controller operates. The processor 6 is connected to the memory controller 2 via the internal system bus 8 of the ASIC of the device with which the memory controller 2 is associated.

The microprocessor executes code that may be stored in the microprocessor itself or in the memory array 4. Thus the microprocessor has to access the memory array 4 via the memory controller 2 to transfer data to and from the memory array.

The address decoder has an input 220 for receiving a memory access request from the microprocessor 6. The memory access request includes the address of the memory array 4 to be accessed. The address decoder 22 has an output 222 for outputting the address to be accessed. The address decoder also has an output 224 for outputting a sub-controller select signal CS for selecting the sub-controller 24 or 26.

The first sub-controller 24 has an input 240 for receiving the address to be accessed and an input 242 for receiving the sub-controller select signal CS. In response to an appropriate CS signal the first sub-controller 24 generates a plurality of memory signals for controlling the Flash memory 42.

The second sub-controller 24 has an input 260 for receiving the address to be accessed and an input 262 for receiving the sub-controller select signal CS. In response to an appropriate CS signal the second sub-controller 24 generates a plurality of memory signals for controlling the SDRAM memory 44.

Although the outputs 222 and 224 are shown as dedicated outputs, a common data bus may be provided between the address decoder 22 and the sub-controllers 24, 26.

The operation of the address decoder 22 will now be described in more detail. A range of addresses is allocated to each type of memory in the memory array 4. For instance, say the total capacity of the memory array 4 is 2 GB. The addresses 0 to 16 MB are allocated to the Flash memory 42 and addresses above 16 MB are allocated to the SDRAM 44. This information is stored in the address decoder 22.

In use, when the processor 6 accesses the memory, for example to fetch an instruction from the Flash memory 42, the address is first passed to the memory controller 2 through the internal bus 8. When the address decoder receives a memory access request from the microprocessor 6, the address decoder 22 decodes and examines the address of the memory access request and selects the appropriate sub-controller 24, 26 on the basis of the address. If the address to be accessed is within the range of addresses allocated to the first type of memory 42, the address decoder outputs a sub-controller select signal CS1. If the address to be accessed is within the range of addresses allocated to the second type of memory 44, the address decoder outputs a sub-controller select signal CS2. The appropriate sub-controller then generates the appropriate memory access protocol signals.

Figure 2:
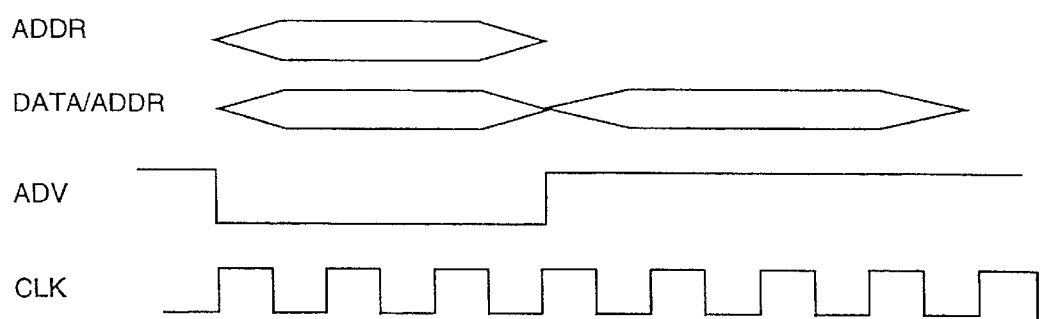
FIG. 2 shows an example of the memory interface signals generated by a first sub-controller.

In response to the sub-controller select signal CS1, the sub-controller 24 generates a plurality of memory interface signals for controlling the burst type memory 42. FIG. 2 shows an example of the memory interface signals generated by the first sub-controller 24. The sub-controller 24 generates: a 22-bit address signal ADDR; a DATA signal that comprises at least one burst of 16 bits; and an address valid signal ADV. When the ADV signal is low, the address information is transmitted.

Figure 3:
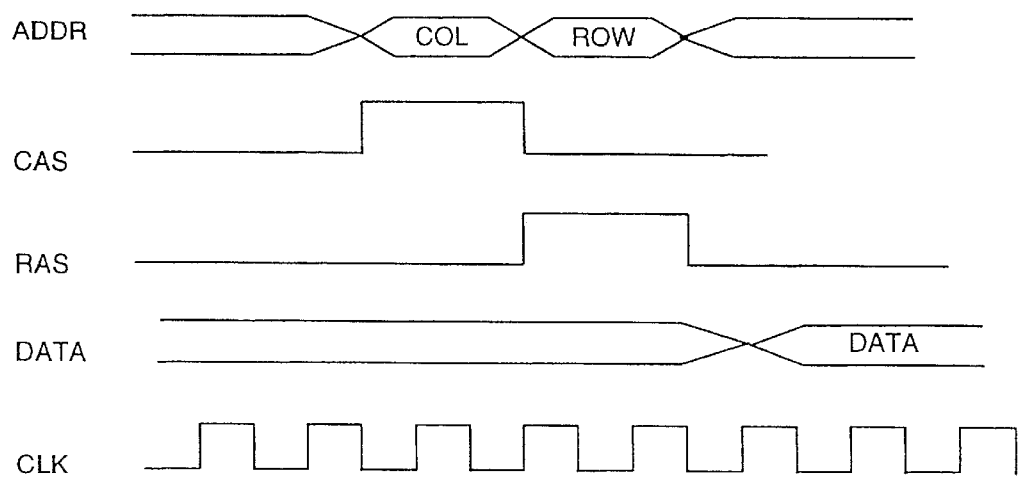
FIG. 3 shows an example of the memory interface signals generated by a second sub-controller.

In response to the sub-controller select signal CS2, the sub-controller 26 generates a plurality of memory interface signals for controlling the SDRAM memory 44. FIG. 3 shows an example of the memory interface signals generated by the second sub-controller 26. The sub-controller 26 generates: a 12 bit address signal ADDR that includes a column address COL and a row address ROW; a column address signal CAS and a row address signal RAS, which indicate when column or row data respectively is being transmitted; a DATA signal that comprises at least 16 bits; and a clock signal CLK. It will be clear to a person skilled in the art that the ROW address may be transmitted before the COL address and that the CAS and RAS signals may be active high (as shown) or active low.

The processor 6 may configure the parameters of the sub-controllers 24, 26. Examples of the sub-controller parameters that the processor may configure are the clock frequency of the memory bus, number of wait states, size of the memory type associated with the sub-controller etc. The parameters of the address decoder may also be configurable so that the address ranges allocated to each type of memory may be altered.

Figure 4:
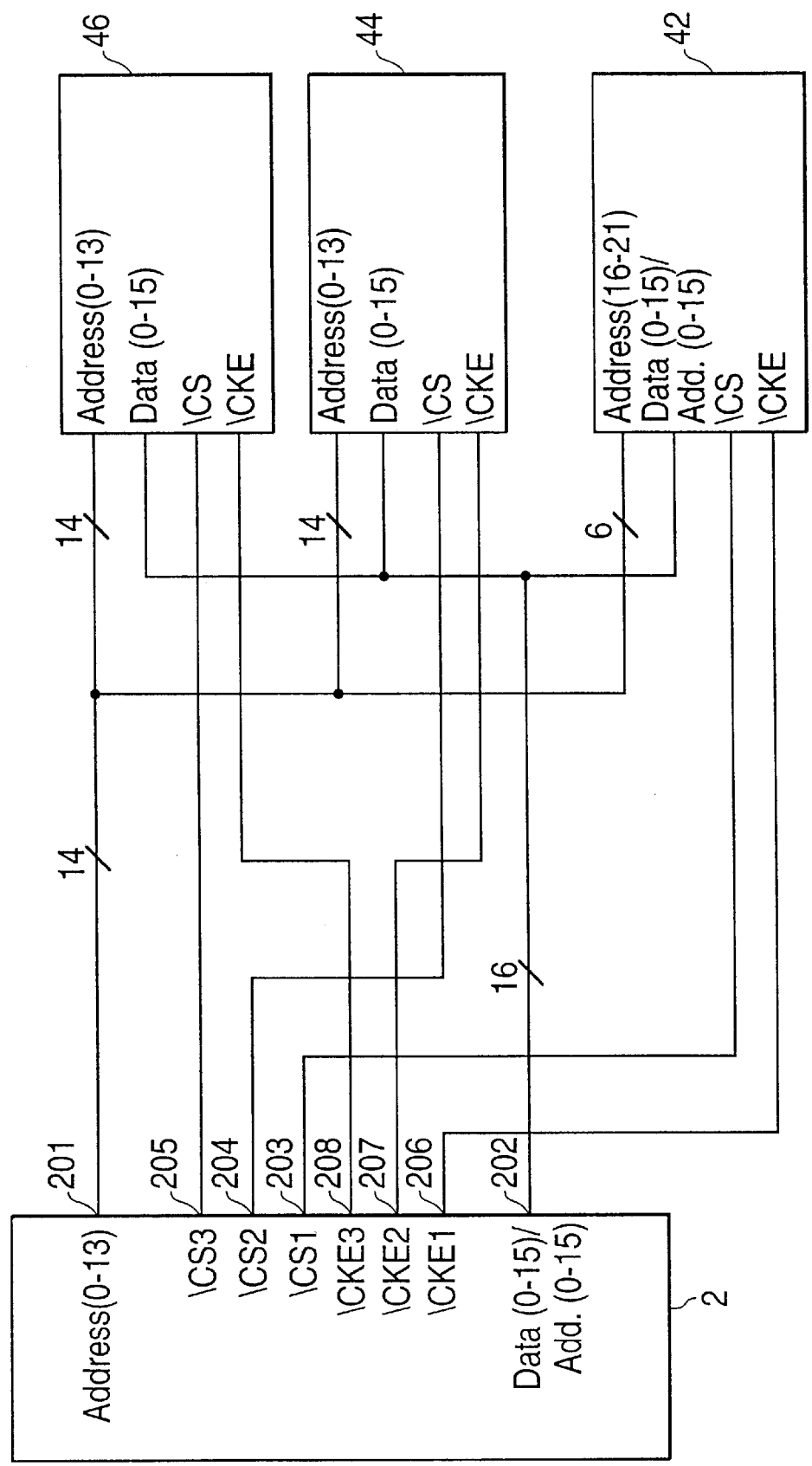
FIG. 4 shows an example of an implementation of a memory controller according to the invention.

FIG. 4 shows the pin implementation of a memory controller 2 according to a second embodiment of the invention. In this embodiment, the memory controller is arranged to operate with three types of memory: Flash memory 42, first SDRAM 44 and second SDRAM 46. A first pin 201 outputs the first 14 bits of the address for the SDRAM memory 44 or 46 and the last 6 bits (bits 16–21) of the address for the Flash memory 42. Pin 202 outputs the 16 bit data for the SDRAM memory and the 16 bit data or the 16 MSB of the address for the Flash memory 42. Pin 203 outputs the chip select signal CS1 for the Flash memory 42. Pin 204 outputs the chip select signal CS2 for the SDRAM memory 44. Pin 205 outputs the chip select signal CS3 for the SDRAM memory 46. Pin 206 outputs a Clock Enable signal CKE1 for the Flash memory 42. Pin 207 outputs a CKE2 signal for the SDRAM memory 44. Pin 208 outputs a CKE3 signal for the SDRAM memory 46.

The memory controller may also include Read Only Memory (ROM) 29. This is used to store the code used by the device on start-up. When the microprocessor is reset (e.g. the device is switched on) the microprocessor 6 interrogates the ROM. Stored in the ROM is information regarding the type of memory to be accessed when the device is reset. For instance the ROM may include instructions that the memory controller should always access the Flash memory on reset. The Flash memory may store information regarding the address ranges to be used by the memory controller 2. This information is read by the microprocessor and stored in the address decoder 22 of the memory controller. The address information (i.e. ranges and type of memory) may either be hardwired into the address decoder 22 or this information may be downloaded from the boot ROM 29. Alternatively the memory controller 2 or boot ROM 29 may be programmed with instructions as to how and from where to download this information. Thus if the method for accessing the first memory can be found from the BOOT ROM/hardwired logic of the memory controller, then the device will gain access to the first memory during boot up and by downloading information from the first memory it will gain access to other memories. Alternatively the device may access this information via an external interface (such as RS232) during boot up from Boot ROM 29 or the hardwired logic of memory controller 2 and by using this interface it may download information needed for accessing memories.

This way of downloading the information enables an straightforward way to change the memory components without any need to change the ASIC.

What is claimed is:

1. A system, which controls the transfer of data to and from a plurality of types of memory with each memory type using a different signalling protocol, the system comprising:
   a controller;
   at least one address bus coupling the controller to the plurality of types of memory; and
   a single data bus, coupling the controller to a plurality of types of memory, which transmits the data between the controller and the types of memory; and wherein
   the controller controls transmitting of addressing signals on the at least one address bus to at least one of the plurality of types of memory to selectively transfer the data to and from storage locations in each of the types of memory.

2. A system according to claim 1 wherein:
one of the memory types is a burst mode memory.

3. A system according to claim 1 wherein:
one of the memory types is flash memory.

4. A system according to claim 1 wherein:
one of the memory types is ROM.

5. A system according to claim 1 comprising:
an additional type of memory.

6. A system in accordance with claim 5 wherein:
the additional type of memory is Synchronous Dynamic Random Access Memory.

7. A system according to claim 5 wherein:
parameters of the controller are configurable.

8. A system in accordance with claim 1 wherein:
parameters of the controller are configurable.

9. A system as claimed in claim 1 comprising:
an electronic telecommunications device.

10. A method of controlling the transfer of data in a system including a plurality of types of memory with each type of memory using a different signalling protocol, a controller which generates a plurality of memory control signals, a single data bus, coupling the controller to the types of memory, which transmits data between the controller and the types of memory and at least one address bus coupling the controller to the plurality of types of memory comprising:

transmitting the data on the single data bus between the controller and the types of memory; and the controller controls transmitting of addressing signals on the at least one address bus to at least one of the plurality of types of memory to selectively transfer the data to and from storage locations in each of the types of memory.

11. A method in accordance with claim 10 wherein:
one of the address busses is combined with the data bus and addressing signals and the data are transmitted on the combined bus between the controller and the types of memory.

12. A method in accordance with claim 11 comprising:
configuring parameters of the memory.

13. A method in accordance with claim 10 comprising:
configuring parameters of the memory.

14. A system, which controls the transfer of data to and from a plurality of types of memory with each memory type using a different signalling protocol, the system comprising:

a controller;

a single data bus, coupling the controller to a plurality of types of memory, which transmits the data between the controller and the types of memory; and a plurality of address busses coupling the controller to the types of memory; and wherein the plurality of address busses transmit addressing signals from the controller to the types of memory which address storage locations in the types of memory to selectively transfer the data to and from the storage locations in each of the types of memory.

15. A system in accordance with claim 14 wherein:
one of the address busses is combined with the data bus.

16. A system in accordance with claim 15 wherein;
the one of the address busses is coupled to a single type of memory.

17. A system in accordance with claim 16 wherein:
a number of address and data bits carried by the combined one address and data bus is identical.

18. A method of controlling the transfer of data in a system including a plurality of types of memory with each type of memory using a different signalling protocol, a controller which generates a plurality of memory control signals and a single data bus, coupling the controller to the types of memory, which transmits data between the controller and the types of memory and a plurality of address busses coupling the controller to the types of memory comprising:

transmitting the data on the single data bus between the controller and the types of memory; and wherein the plurality of address busses transmit addressing signals from the controller to the types of memory to selectively transfer the data to and from the storage locations in each of the types of memory.

19. A method in accordance with claim 18 comprising:
configuring parameters of the memory.

* * * * *